United States Patent
Chen et al.

(10) Patent No.: US 9,907,014 B2
(45) Date of Patent: Feb. 27, 2018

(54) SYSTEM AND METHOD FOR SUBSCRIPTION AND POLICY PROVISIONING

(71) Applicant: FutureWei Technologies, Inc., Plano, TX (US)

(72) Inventors: Bin Chen, Schaumburg, IL (US); George Calcev, Hoffman Estates, IL (US); Zhixian Xiang, Plano, TX (US); Hanan Ahmed, Westland, MI (US)

(73) Assignee: Futurewei Technologies, Inc., Plano, TX (US)

( * ) Notice: Subject to any disclaimer, the term of this patent is extended or adjusted under 35 U.S.C. 154(b) by 591 days.

(21) Appl. No.: 13/933,358

(22) Filed: Jul. 2, 2013

(65) Prior Publication Data

US 2014/0010222 A1    Jan. 9, 2014

Related U.S. Application Data (60) Provisional application No. 61/667,656, filed on Jul. 3, 2012, provisional application No. 61/668,908, filed on Jul. 6, 2012.

(51) Int. Cl.
*H04W 48/16* (2009.01)
*H04W 4/00* (2018.01)
*H04W 48/20* (2009.01)

(52) U.S. Cl.
CPC ........... *H04W 48/16* (2013.01); *H04W 4/001* (2013.01); *H04W 48/20* (2013.01)

(58) Field of Classification Search
None
See application file for complete search history.

(56) References Cited

U.S. PATENT DOCUMENTS

2005/0055453 A1  3/2005  Zhu et al.
2007/0043692 A1  2/2007  Oh et al.
(Continued)

FOREIGN PATENT DOCUMENTS

CN    1606308 A    4/2005
CN  101243641 A    8/2008
(Continued)

OTHER PUBLICATIONS

Alcatel Lucent, "Wi-Fi Roaming—Building on ANDSF and Hotspot 2.0," XP002677915, retrieved from the Internet: http://www.alcatel-lucent.com, Feb. 27, 2012, 46 pages.

(Continued)

*Primary Examiner* — Adnan Baig
(74) *Attorney, Agent, or Firm* — Slater Matsil, LLP (57) ABSTRACT

Wireless fidelity (Wi-Fi) access points (APs) can advertise their support of both OMA-DM and SOAP-XML protocols by including protocol capability information in a broadcast or probe response message. The protocol capability information can include an OSU method list subfield that indicates that the Wi-Fi AP supports both OMA-DM and SOAP-XML protocols. The broadcast message may be an Access Network Query Protocol (ANQP) message, a beacon message, or some other generic advertisement services (GAS) message. Wi-Fi APs can also specify which WLAN type is preferred by a network operator by including a WLAN access type indication in a broadcast or probe response message. The WLAN access type indication may specify that a network operator prefers a passpoint, non-passpoint, vendor specific WLAN. The WLAN access type indication may be included in an access network discovery and selection function (ANDSF) management object (MO).

24 Claims, 6 Drawing Sheets

(56) References Cited

U.S. PATENT DOCUMENTS

| | | | |
|---|---|---|---|
| 2009/0119655 A1 | 5/2009 | Quilty | |
| 2010/0070634 A1* | 3/2010 | Ranjan | H04L 63/0869 709/228 |
| 2011/0019653 A1 | 1/2011 | Seok | |
| 2011/0222520 A1* | 9/2011 | Montemurro | H04W 74/006 370/338 |
| 2011/0280228 A1* | 11/2011 | McCann | H04W 48/14 370/338 |
| 2012/0072976 A1* | 3/2012 | Patil | H04W 12/06 726/6 |
| 2013/0007853 A1* | 1/2013 | Gupta | H04W 12/06 726/5 |
| 2013/0039275 A1* | 2/2013 | Patil | H04W 48/20 370/328 |
| 2013/0070644 A1* | 3/2013 | McCann | H04W 48/16 370/255 |
| 2013/0208696 A1* | 8/2013 | Garcia Martin | H04W 36/32 370/331 |
| 2013/0232561 A1* | 9/2013 | Gupta | H04W 8/18 726/5 |
| 2015/0139210 A1* | 5/2015 | Marin | H04W 12/04 370/338 |

FOREIGN PATENT DOCUMENTS

| | | |
|---|---|---|
| CN | 101267438 A | 9/2008 |
| CN | 101682539 A | 3/2010 |
| CN | 101843129 A | 9/2010 |
| EP | 1862932 A1 | 12/2007 |
| WO | 2011038771 A1 | 4/2011 |
| WO | 2011088406 A1 | 7/2011 |
| WO | 2011160682 A1 | 12/2011 |
| WO | 2012035366 A1 | 3/2012 |
| WO | 2012036992 A2 | 3/2012 |
| WO | 2013037064 A1 | 3/2013 |

OTHER PUBLICATIONS

GSM Association, Recommendations for Minimal Wi-Fi Capabilities of Terminals, Official Document TS.22, Version 1.0, Jun. 7, 2012, 38 pages.

Wi-Fi Alliance, "Wi-Fi Alliance® Technical Committee Hotspot 2.0 (Release 2) Technical Specification—Version 3.0," 2013, 199 pages.

"3rd Generation Partnership Project; Technical Specification Group Services and System Aspects; Architecture enhancements for non-3GPP accesses (Release 12)," 3GPP TX 23.402 v12.0.0, Mar. 2013, 253 pages.

Hepworth, E. et al., "Interworking Requirements," IEEE 802.11-04/223r0, Mar. 2004. Slides 1-9.

Hepworth, E. et al., "Co-existence of Different Authentication Models," IEEE 802.11-03/827r0, Nov. 2003. Slides 1-9.

Ohashi, Genichiro, "NGH (Next Generation Hotspot", News & Trend, Nikkei Personal Computing, No. 652, Nikkei Business Publications, Inc., Jun. 25, 2012, p. 16, with English Translation 4 pages total.

* cited by examiner

| MEANING | VALUE |
| --- | --- |
| OMA-DM | 0 |
| SOAP-XML SPP | 1 |
| BOTH (OMA-DM AND SOAP-XML SPP) | X |
| RESERVED | (X+1) - 255 |

| OSU PROVIDER LENGTH | OSU FRIENDLY NAME DUPLES LENGTH | OSU FRIENDLY NAME DUPLES | OSU_NAI LENGTH | OSU_NAI (OPTIONAL) | OSU SERVER URI 1 LENGTH | OSU SERVER URI 1 | OSU METHOD 1 | OSU SERVER URI 2 LENGTH | OSU SERVER URI 2 (OPTIONAL) | OSU METHOD 2 (OPTIONAL) | ICONS AVAILABLE |
|---|---|---|---|---|---|---|---|---|---|---|---|
| OCTETS: 2 | 2 | VAR | 1 | VAR | 1 | VAR | 1 | 1 | VAR | 1 | VAR |

| OSU PROVIDER LENGTH | OSU FRIENDLY NAME DUPLES LENGTH | OSU FRIENDLY NAME DUPLES | OSU_NAI LENGTH | OSU_NAI (OPTIONAL) | OSU SERVER URI 1 LENGTH | OSU SERVER URI | OSU METHOD | POLICY PROVISIONING METHOD | ICONS AVAILABLE |
|---|---|---|---|---|---|---|---|---|---|
| OCTETS: 2 | 2 | VAR | 1 | VAR | 1 | VAR | 1 | 1 | VAR |

| INFORMATION ID | LENGTH | POLICY PROVIDER #1 | POLICY PROVIDER #2 (OPTIONAL) | ... | POLICY PROVIDER #N (OPTIONAL) |
|---|---|---|---|---|---|
| 2 | 2 | VAR | VAR | | VAR |

OCTETS:

| POLICY PROVIDER LENGTH | POLICY FRIENDLY NAME DUPLES LENGTH | POLICY FRIENDLY NAME DUPLES | POLICY_N AI LENGTH | POLICY_N AI (OPTIONAL) | POLICY SERVER URI LENGTH | POLICY SERVER URI | POLICY METHOD |
|---|---|---|---|---|---|---|---|
| 2 | 2 | VAR | 1 | VAR | 1 | VAR | 1 |

OCTETS:

SYSTEM AND METHOD FOR SUBSCRIPTION AND POLICY PROVISIONING

This application claims priority to U.S. Provisional Application No. 61/667,656 filed on Jul. 3, 2012, entitled "System and Method for Network Selection," and U.S. Provisional Application No. 61/668,908 filed on Jul. 6, 2012, entitled "System and Method for Subscription and Policy Provisioning," both of which are incorporated herein by reference as if reproduced in its entirety.

TECHNICAL FIELD

The present invention relates to wireless communications, and, in particular embodiments, to systems and methods for subscription and policy provisioning.

BACKGROUND

Today's mobile devices often have the capability to access wireless fidelity (Wi-Fi) networks, such as those defined by Alliance Hotspot 2.0 technical specification release 2 version 1.02 (Hotspot 2.0, rel. 2, v1.02), which is incorporated herein by reference. Typically, a mobile device may engage in an On-line Sign Up (OSU) process to gain access to a Wi-Fi network. The OSU process may allow the mobile device to subscribe to the network as well as to be provisioned network access credentials for secure access. Different protocols may be used for OSU depending on the capabilities of the mobile station as well as the base station. Accordingly, mechanisms for advertising and selecting OSU protocols are needed so that mobile devices may access Wi-Fi networks.

SUMMARY

Technical advantages are generally achieved, by embodiments of this disclosure which describe systems and methods for subscription and policy provisioning.

In accordance with an embodiment, a method for user subscription and provisioning in a wireless network is provided. In this example, the method includes transmitting a message comprising protocol capability information to one or more mobile stations. The protocol capability information specifies that a Wi-Fi AP is capable of using both an Open Mobile Alliance (OMA)—Device Management (OMA-DM) protocol and a Simple Object Access Protocol (SOAP)—Extensible Markup Language (SOAP-XML) protocol when establishing network access for the one or more mobile stations. An apparatus for performing this method is also provided.

In accordance with another embodiment, another method for user subscription and provisioning in a wireless network is provided. In this example, the method includes receiving a broadcast message from a wireless fidelity (Wi-Fi) access point (AP). The broadcast message includes protocol capability information specifying that a Wi-Fi AP is capable of using both an Open Mobile Alliance (OMA)—Device Management (OMA-DM) protocol and a Simple Object Access Protocol (SOAP)—Extensible Markup Language (SOAP-XML) protocol when establishing network access for the one or more mobile stations. An apparatus for performing this method is also provided.

In accordance with yet another embodiment, a method for Wi-Fi local area network (WLAN) discovery is provided. In this example, the method includes sending an access network discovery and selection function (ANDSF) management object (MO) to a user equipment (UE) when the UE roams into a coverage area. The ANDSF MO includes a WLAN access type indication specifying at least one type of WLAN that is preferred by a network operator for UE connection. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Wi-Fi access points (APs) and mobile devices typically perform OSU using either an Open Mobile Alliance (OMA)—Device Management (OMA-DM) protocol or a Simple Object Access Protocol (SOAP)—Extensible Markup Language (SOAP-XML) protocol. The protocol used for OSU may depend on the capability of the mobile stations and/or Wi-Fi APs. For example, OMA-DM enabled mobile stations may seek Wi-Fi access points (APs) that support OMA-DM protocol, while SOAP-XML enabled mobile stations may seek Wi-Fi APs that support SOAP-XML protocol. Conventional mechanisms defined in Hotspot 2.0, rel. 2, v1.02 allow Wi-Fi APs to advertise their support of either the OMA-DM protocol or the SOAP-XML protocol (but not both) via broadcast messages (e.g., beacons, etc.). Accordingly, mobile stations may monitor broadcast messages while roaming between Wi-Fi hotspots in order to identify Wi-Fi APs that support their enabled OSU protocol. However, Wi-Fi APs that support both OMA-DM and SOAP-XML protocols may be unable to fully advertise their OSU capabilities using the conventional mechanisms defined in Hotspot 2.0, rel. 2, v1.02, e.g., which allow the Wi-Fi APs to advertise support of either OMA-DM protocol or the SOAP-XML protocol, but not both. This creates inefficiencies, as dual-configured Wi-Fi APs may choose between advertising their OMA-DM capability (and foregoing SOAP-XML enabled mobile stations) or their SOAP-XML capability (and foregoing OMA-DM enabled mobile stations). Accordingly, mechanisms for allowing Wi-Fi APs to advertise their support of both OMA-DM and SOAP-XML protocols are desired.

Aspects of this disclosure provide techniques that enable a Wi-Fi AP to advertise its support of both OMA-DM and SOAP-XML protocols prior to OSU. More specifically, the Wi-Fi AP may broadcast a message comprising an OSU method list subfield that indicates that the Wi-Fi AP supports both OMA-DM and SOAP-XML protocols. Accordingly, mobile stations receiving the broadcast message may recognize that the Wi-Fi AP supports both OMA-DM and SOAP-XML protocols. The broadcast message may be an Access Network Query Protocol (ANQP) message, a beacon message, or some other generic advertisement services (GAS) message. The OSU method list subfield may also be included in a probe response.

Additional aspects of this disclosure provide a WLAN access type indication that specifies a WLAN that is preferred by a network operator for UE connection. For example, a UE may roam into a coverage area having multiple WLANs. The WLAN access type indication provided herein allows the network operator to specify which of the WLAN access types (e.g., passpoint, non-passpoint, vendor specific, etc.) is preferred for UE connection. The WLAN access type indication may be included in an access network discovery and selection function (ANDSF) management object (MO) message.

Figure 1:
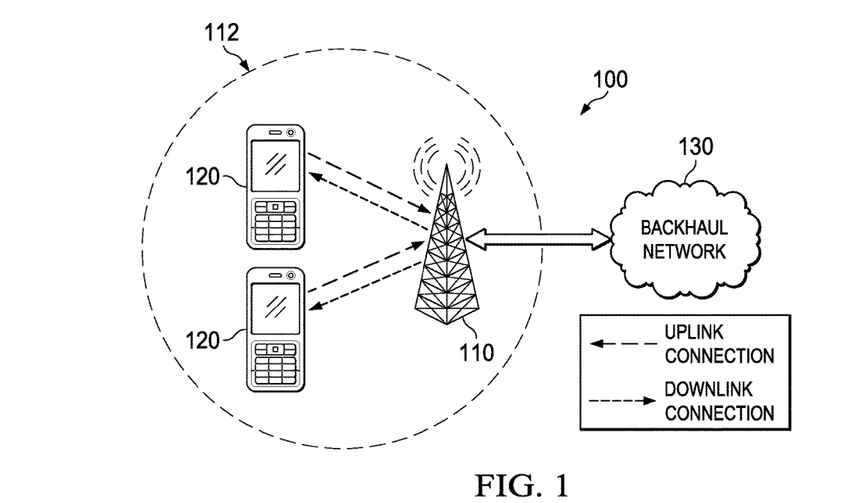
FIG. 1 illustrates a diagram of a wireless network for communicating data.
Figure 2:
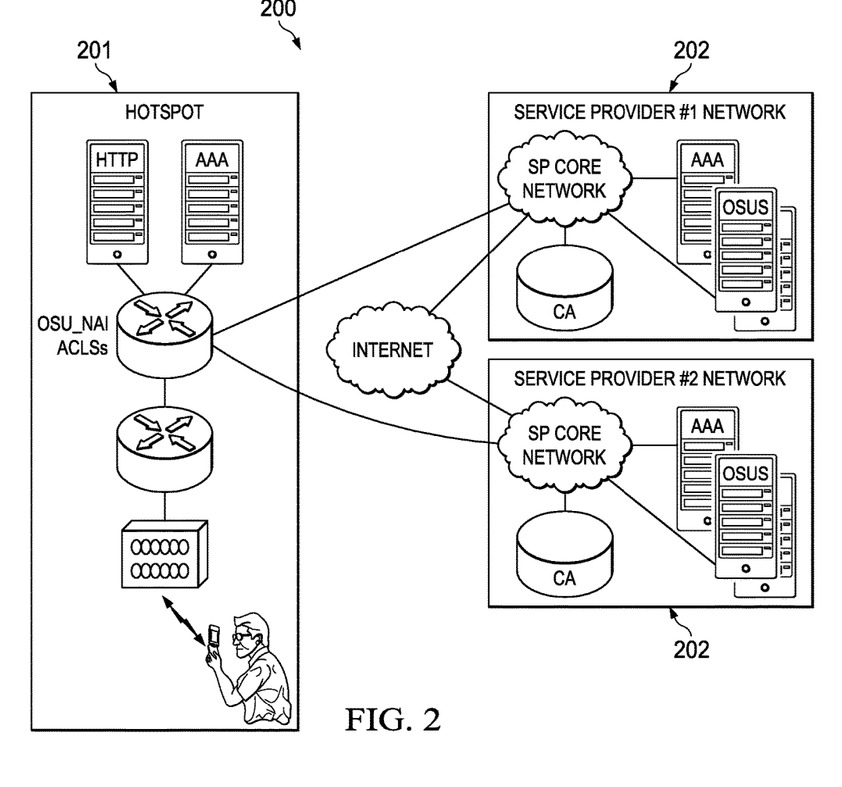
FIG. 2 illustrates a diagram of an OSU Architecture.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc. FIG. 2 illustrates an Online Signup Architecture 200 having a Wi-Fi hotspot 201 and a plurality of service provider networks 202. As shown, a user uses the Wi-Fi hotspot 201 to access the service provider networks 202.

Figure 3:
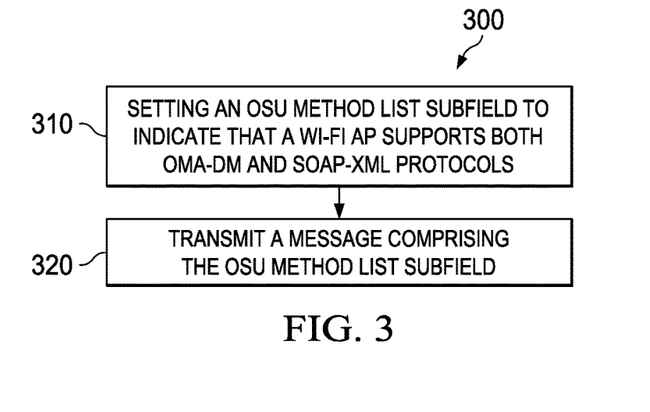
FIG. 3 illustrates a flowchart of an embodiment method for performing user subscription and provisioning.

FIG. 3 illustrates a method 300 for performing user subscription and provisioning in a wireless network, as may be performed by a Wi-Fi AP. As shown, the method 300 begins with step 310, where the Wi-Fi AP sets an OSU method list subfield to indicate that the Wi-Fi AP supports both OMA-DM and SOAP-XML protocols. Thereafter, the method 300 proceeds to step 320, where the Wi-Fi AP transmits a message comprising the OSU method list subfield to one or more mobile stations. The mobile stations may recognize that the Wi-Fi AP supports both OMA-DM and SOAP-XML protocols upon receiving the message comprising the OSU method list subfield, and may elect to initiate or request an OSU procedure with the Wi-Fi AP using one of the protocols. In some embodiments, the message transmitted in step 320 is a broadcast message, such as an (ANQP) message, a beacon message, or a generic advertisement services (GAS) message. In other embodiments, the message transmitted in step 320 is a probe response message.

Figure 4:
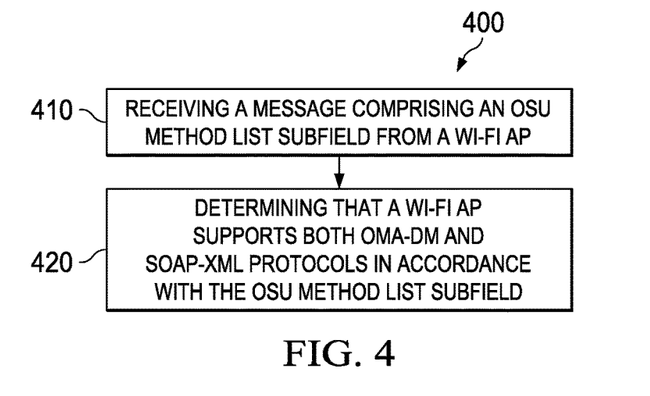
FIG. 4 illustrates a flowchart of another embodiment method for performing user subscription and provisioning.

FIG. 4 illustrates a method 400 for performing user subscription and provisioning in a wireless network, as may be performed by a mobile station. As shown, the method 400 begins with step 410, where the mobile station receives a message comprising an OSU method list subfield from a Wi-Fi AP. Thereafter, the method 400 proceeds to step 420, where the mobile station determines that the Wi-Fi AP supports both OMA-DM and SOAP-XML protocols in accordance with OSU method list subfield. The message may be a broadcast message, e.g., an ANQP message, a beacon message, a GAS message, or a unicast message, e.g., a probe response message. FIGS. 3-4 describe the OSU method list subfield in the context of advertising OMA-DM and SOAP-XML capabilities of a Wi-Fi AP. However, the OSU method list subfield may be transmitted by any mobile device (e.g., a mobile station, relay, etc.) to advertise the OMA-DM and SOAP-XML protocol capabilities of that mobile device, or of another device. By way of example, a mobile station may communicate an OSU method list subfield to convey that the mobile station is OMA-DM and SOAP-XML enabled. As another example, a Wi-Fi AP may communicate the OSU method list subfield to convey that a policy server (or group of policy servers) connected to the Wi-Fi AP support OMA-DM and SOAP-XML protocols.

In some networks, OSU servers may be capable of providing only one protocol (e.g., either OMA-DM or SOAP-XML) for online sign up, and therefore may be unable to support both OMA-DM enabled and SOAP-XML enabled mobile devices. For example, an OSU configured to provide OMA-DM may be unable to support SOAP-XML enabled mobile devices, while an OSU configured to provide SOAP-XML may be unable to support OMA-DM enabled mobile devices. Hence, a mechanism for allowing an OSU to concurrently support both OMA-DM and SOAP-XML capable devices is desired. Another issue is that there is no information about method for policy provisioning, which is problematic in so far as a device's capability may not match that of the policy server. For example, a policy server providing OMA-DM for policy provisioning may be unable to provide a SOAP-XML capable device with policy information after the SOAP-XML capable device obtains a subscription from the OSU. Without obtaining the policy information, the device may be unable to access the service. As such, a mechanism for communicating provisioning information from a policy server to a device is desired.

Aspects of this disclosure suggest a method of provisioning subscription and policy information. In some embodiments, the OSU server and policy server may support multiple protocols for subscription and policy provisioning, which may allow the servers to support a diverse set of devices (e.g., devices with different capabilities). In some embodiments, information specifying the capabilities supported by the OSU/policy server is transferred from the network to a device via one or more Access Network Query Protocol (ANQP) messages.

Figure 5:
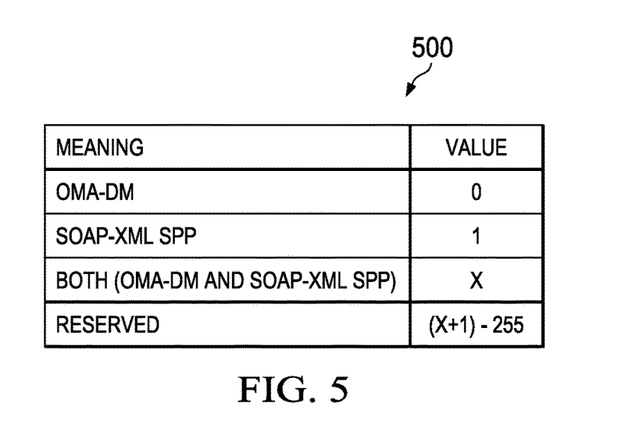
FIG. 5 illustrates a table of OSU method list subfield values.

FIG. 5 illustrates a table identifying a plurality of OSU method list subfield values for identifying OSU protocol capabilities of a device (e.g., Wi-Fi AP, policy server, a mobile station, etc.). As shown, a value (X) may be included in an OSU method list subfield to indicate support of both OMA-DM and SOAP-XML protocols. Hence, a device receiving such a message (e.g., an ANQP message specifying a value that indicates both OMA-DM and SOAP-XML are supported) may determine that the device can connect to the corresponding OSU server using either an OMA-DM protocol or a SOAP-XML protocol.

In an embodiment, an OSU server may identify which method/protocol is supported by the device when it receives a message from the device. Typically, this message may be the first message of the OSU message exchange. The OSU server may identify the method/protocol in accordance with the format of the message and/or an indicator in the message indicating which method/protocol is used by the device. In another embodiment, the server may identify which method/protocol is supported by the device via a previous procedure (for example an ANQP query message).

Figure 6:
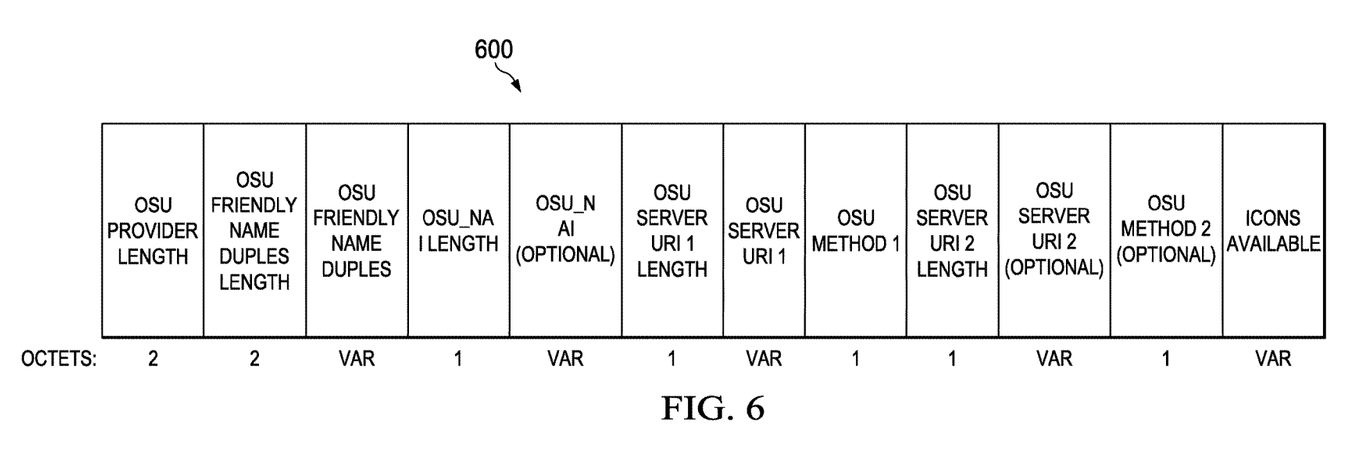
FIG. 6 illustrates a diagram of another embodiment OSU Provider field.

In an embodiment, the OSU server may have different uniform resource identifiers (URIs) depending on which protocols it supports. For example, an OSU server supporting OMA-DM may use a first URI (URI-1), while an OSU server supporting SOAP-XML may use a second URI (URI-2). An OSU server supporting both OMA-DM and SOAP-XML may have a different URI (e.g., URI-X). FIG. 6 illustrates an OSU Provider field 600 for advertising protocol capabilities of multiple OSU servers. As shown, the OSU provider field 600 includes an OSU server URI 2 Length field, an OSU Server URI 2 field (optional), and an OSU method 2 field (optional). Fields denoted as optional may be omitted/excluded from the OSU provider field 600, e.g., when the OSU server URI 2 length field has a value of zero.

Figure 7:
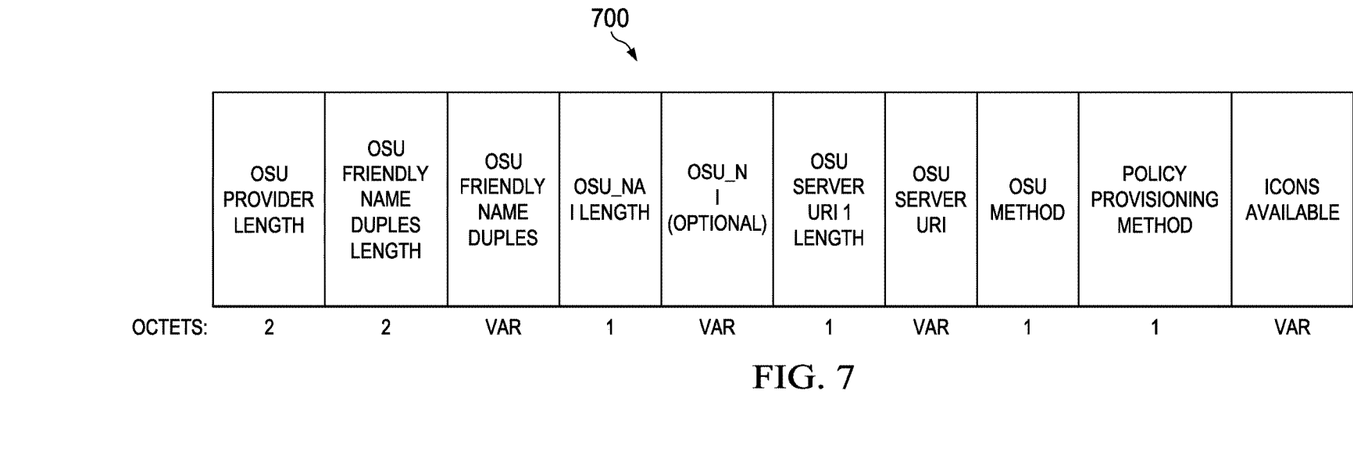
FIG. 7 illustrates a diagram of an embodiment OSU Provider field.

In an embodiment, subscription may include a method for policy provisioning, which could be shown as 'Subscription/Policy/PolicyUpdate/OMA-DM/URI' or a 'Subscription/Policy/PolicyUpdate/SOAP-XML/URI,' depending on which protocol is used. When the device gets such information, it can access the correct URI based on the protocol supported by the device. If the server supports both methods/techniques for a single URI, then the device may negotiate with the server to determine which method/protocol will be used for policy provisioning. In an embodiment, the network may provide policy provisioning information to devices via a pre-association message, such as an ANQP message, a beacon message, or some other generic advertisement services (GAS) messages. FIG. 7 illustrates an OSU Provider field 700 for advertising protocol capabilities of an OSU server using policy provisioning method field. In embodiments, the policy provisioning method field may identify the protocol capabilities (e.g., OMA-DM and/or SOAP-XML) in a manner similar to that discussed above. In other embodiments, the policy provisioning method field may indicate whether the policy provisioning protocol is the same as the OSU protocol. For instance, the policy provisioning information may indicate a value of zero when the policy provisioning method/protocol is the same as the OSU protocol, and a value of one when the policy provisioning method/protocol is different than the OSU protocol.

Upon receiving the policy provisioning information, a device may determine whether its protocol capability is supported by a policy server and/or Wi-Fi AP. If so, the device may sign up with the corresponding OSU server. If not, the device may look for a server or Wi-Fi AP that supports its protocol capability.

Figure 8:
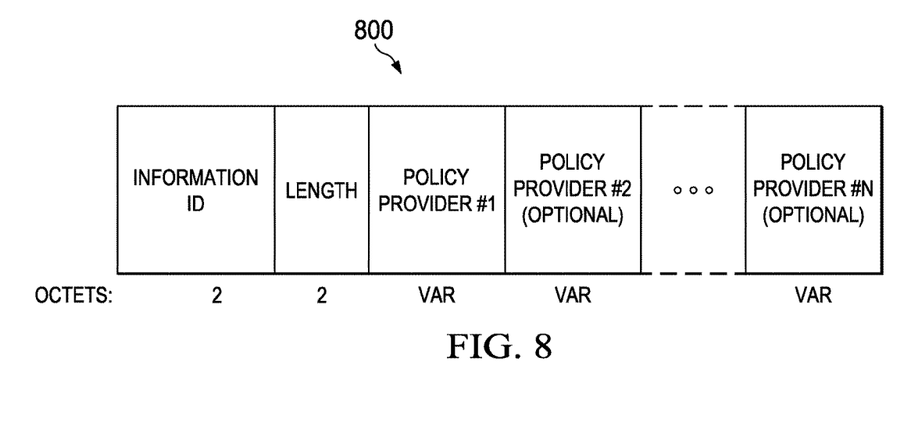
FIG. 8 illustrates a diagram of an embodiment ANQP message.
Figure 9:
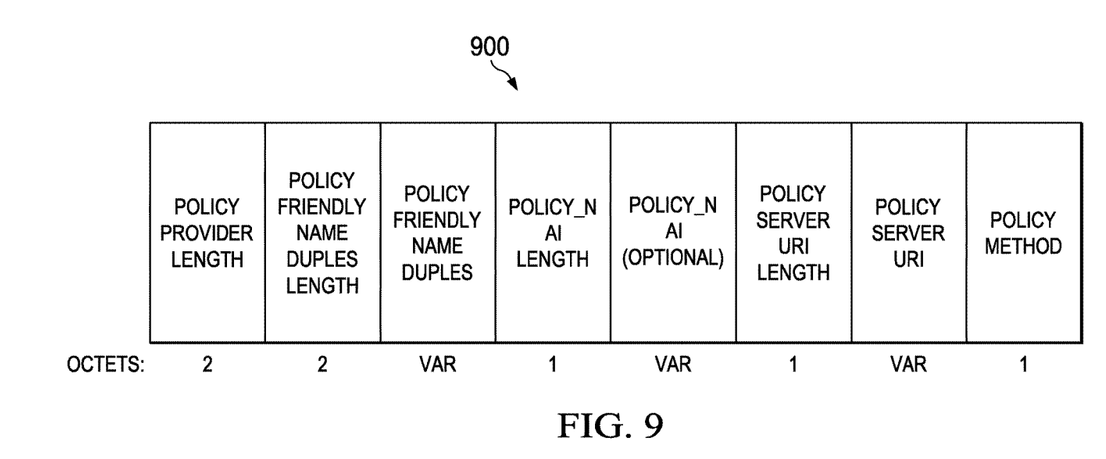
FIG. 9 illustrates a diagram of another embodiment ANQP message.

Policy provisioning information may be communicated in separate ANQP messages. FIG. 8 illustrates an ANQP message 800 comprising a Hotspot Policy Providers List format, while FIG. 9 illustrates an ANQP message 900 comprising a Policy Provider field format. The ANQP messages 800 and 900 may be communicated between Wi-Fi APs and Wi-Fi mobile stations (Wi-Fi STAs).

Wi-Fi Alliance is defining a Hotspot 2.0 specification to help dual or single mode Wi-Fi devices select the appropriate WLAN when roaming into a coverage area having multiple WLANs. In some examples, it may be beneficial for the UE to access a WLAN that is owned by the operator to which the UE is subscribed or with which the UE has a roaming relationship. Aspects of this disclosure provide a WLAN access type indication in an ANDSF management object (MO) in order to allow the network operator to specify which WLAN or WLAN access type is preferred for UE connection.

The Wi-Fi Alliance defines a WFA management object (MO) (subscription MO) to store and manage these network selection operator policies. 3GPP also defines several mechanisms for a mobile device to decide and select the WLAN in a fixed network. One mechanism is to statically preconfigure policies on the user equipment (UE). Another is to dynamically provision policies via an access network discovery and selection function (ANDSF) server within the network. The policies are dynamically provisioned using an ANDSF MO, which allows the server to store and manage the operator's policies.

Figure 10:
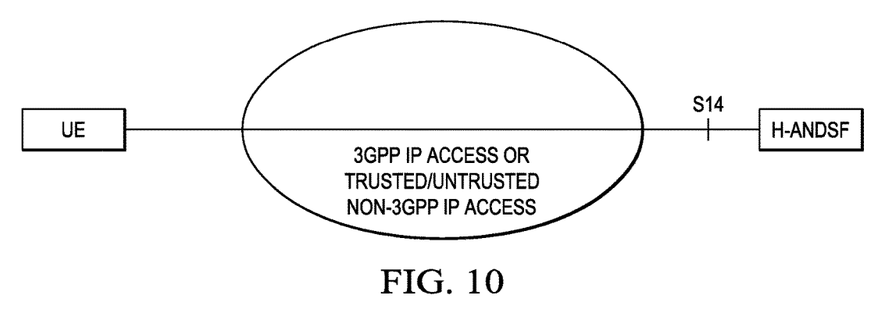
FIG. 10 illustrates a diagram of a terminal interacting with a server through an interface.

FIG. 10 illustrates a UE interacting with an ANDSF through an S14 interface (e.g., an interface for IP level signaling) to obtain a network selection policy from the network. There are generally two ways for a policy to be populated to the UE. The first is a push mode where the ANDSF server pushes a policy to the UE, and the second is a pull mode where the UE requests a policy from the ANDSF server. One of the pieces of information provided by the ANDSF server to the UE to help perform access network selection is the inter-system routing policy (ISRP) information, which includes validity conditions, or conditions that indicate when a provided policy is valid. For IP flow mobility (IFOM), the validity conditions may include one or more filter rules, each of which identifying a prioritized list of access technologies/access networks that can be used by the UE (when available) to route traffic matching IP filters on an APN. A filter rule also identify which radio access technologies or networks that are restricted for traffic matching the IP filter on an APN. For example, a filter rule may specify that a WLAN is not allowed for traffic flows being communicating using real time transport protocol (RTP) or RTP control protocol (RTCP) on a given APN.

Figure 11:
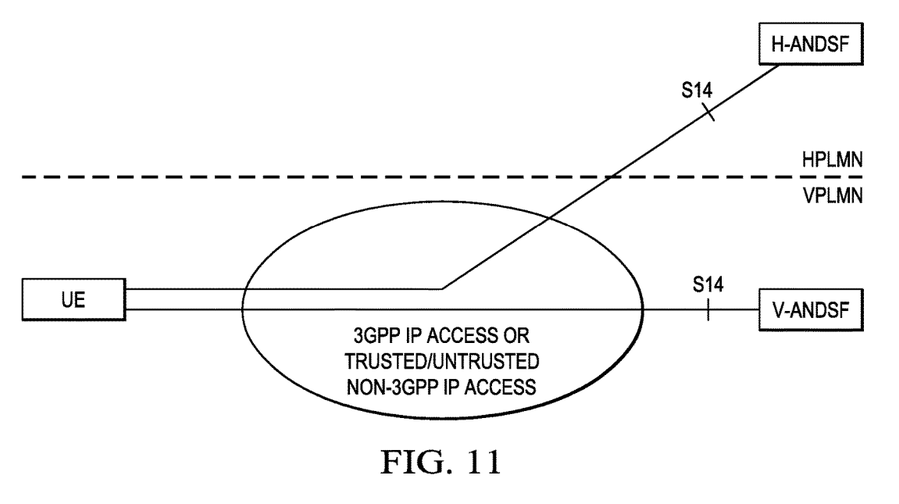
FIG. 11 illustrates a diagram of a terminal interacting with a home server and a visiting server through an interface.

Currently, 3GPP and Wi-Fi Alliance are working separately to define their own network selection policy. Although there is an alignment effort in 3GPP to avoid conflicting policies, there still are two separate management object (MO) policies and delivery mechanisms being developed by these two independent organizations. Therefore, it is possible that a device will need to store two types of MOs for the WLAN selection and to support both provisioning mechanisms. For example, when a UE is in a visited network, the UE can contact a home ANDSF (H-ANDSF) server and/or a visited ANDSF (V-ANDSF) server to get its operator policy using ANDSF. FIG. 11 illustrates a UE obtaining an operator policy from an H-ANDSF server and/or a V-ANDSF server. When a UE has operator policies from both H-ANDSF and V-ANDSF, and the two policies conflict, the UE may follow the visited operator policy, as defined in 3GPP Technical Specification (TS) 23.402, which is incorporated herein by reference as if reproduced in its entirety.

Furthermore, after the deployment of Hotspot 2.0, it is possible to have a legacy access point (AP) and a hotspot 2.0 in the same area or the same network. Compared to a legacy AP, Hotspot 2.0 generally is more powerful and can provide higher quality service to customers. Accordingly, operators may want to provide different services to different customers. For instance, an operator can provide high rank customers with hotspots 2.0 and ensure they are not interfered with by lower rank customers who are directed to the legacy AP. Another problem arises when the current ANDSF server or other policies cannot distinguish between these two different WLANs for network selection.

Aspects of this disclosure provide mechanisms for supporting coexisting Hotspot 2.0 and non-hotspot networks. More specifically, embodiments of this disclosure provide indicators for a network to guide and control a mobile terminal to correctly select the appropriate Wi-Fi AP and obtain the right network selection policy from the visited network. An embodiment creates three new indicators from the network to the terminal. A first indication indicates whether a terminal needs to receive more network selection policy from a non-3GPP visited network. A second indication from the network indicates the policy provision mechanism it is supporting. A third indication from the network indicates the policy server it is supporting. Embodiments described herein create a new WLAN access type indication for ANDSF policy (e.g., non-hotspot (HS), HS, and vendor specific) and enhance collaboration between ANDSF MO and WFA MO. Embodiments also provide operators with more flexibility and management capabilities for user mobility between Hotspot and legacy APs, as well as give operators more control over UE mobility between Wi-Fi and cellular networks. Aspects of this disclosure also provide better user experiences and increase operator revenue. Aspects of this disclosure may be adopted into future 3GPP specifications, as well as be implemented in Wi-Fi and cellular networks and devices, e.g., Wi-Fi access point/access controllers, Wi-Fi plus cellular dual mode terminals, terminals with hotspot 2.0 support, ANDSF server, ANQP server, etc.

As discussed above, a problem may arise if a visited operator only supports Wi-Fi service with a Wi-Fi Alliance (WFA) MO, as the visited operator network may include a WFA server while lacking a V-ANDSF server. To address the issue, aspects of this disclosure add an indicator in the ANDSF MO to indicate whether the UE needs to check with the visited WLAN for additional WFA specific network selection policy. For example, in ANDSF's network work selection policy, when the ANDSF server suggests the UE choose WLAN, it uses an indicator to tell the UE whether the UE should check the WFA MO for operator policy.

Additionally, indicators are included in ANQP or HS2.0 beacon signals (or HS2.0 probe response responses) to indicate a policy provision mechanism supported by the Hotspot (e.g., OMA-DM, SOAP_XML, etc.) as well as to indicate policy provisioning server provided by the operator, e.g., an ANDSF server, a WFA server, etc. In this way, the terminal will know which provisioning mechanisms are available for a given network, as well as provisioning capabilities may be used to attach to the network.

Another problem arises when a current ANDSF server or other policy server cannot distinguish between two or more different WLANs for network selection. To address this issue, aspects of this disclosure create a type access indicator for WLAN in ANDSF and HS2.0 policy, such as passpoint WLAN, non-passpoint WLAN, vendor-specific WLAN, and the like. The type access allows the operator to demonstrate a preference between different types of WLANs for network selection if both a Hotspot 2.0 capable hotspot (passpoint WLAN) and a non-HS2.0 capable hotspot exist in the same access location. A vendor specific WLAN may be used for operator or vendor specific usage, such as testing, trial or proprietary implementation, etc.

Figure 12:
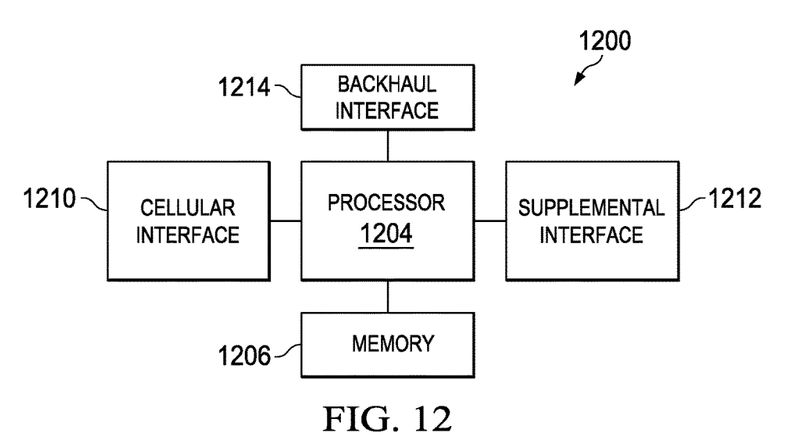
FIG. 12 illustrates a block diagram of an embodiment communications device.

FIG. 12 illustrates a block diagram of an embodiment of a communications device 1200, which may be equivalent to one or more devices (e.g., UEs, NBs, etc.) discussed above. The communications device 1200 may include a processor 1204, a memory 1206, a cellular interface 1210, a supplemental interface 1212, and a backhaul interface 1214, which may (or may not) be arranged as shown in FIG. 12. The processor 1204 may be any component capable of performing computations and/or other processing related tasks, and the memory 1206 may be any component capable of storing programming and/or instructions for the processor 1204. The cellular interface 1210 may be any component or collection of components that allows the communications device 1200 to communicate using a cellular signal, and may be used to receive and/or transmit information over a cellular connection of a cellular network. The supplemental interface 1212 may be any component or collection of components that allows the communications device 1200 to communicate data or control information via a supplemental protocol. For instance, the supplemental interface 1212 may be a non-cellular wireless interface for communicating in accordance with a Wireless-Fidelity (Wi-Fi) or Bluetooth protocol. Alternatively, the supplemental interface 1212 may be a wireline interface. The backhaul interface 1214 may be optionally included in the communications device 1200, and may comprise any component or collection of components that allows the communications device 1200 to communicate with another device via a backhaul network.

Figure 13:
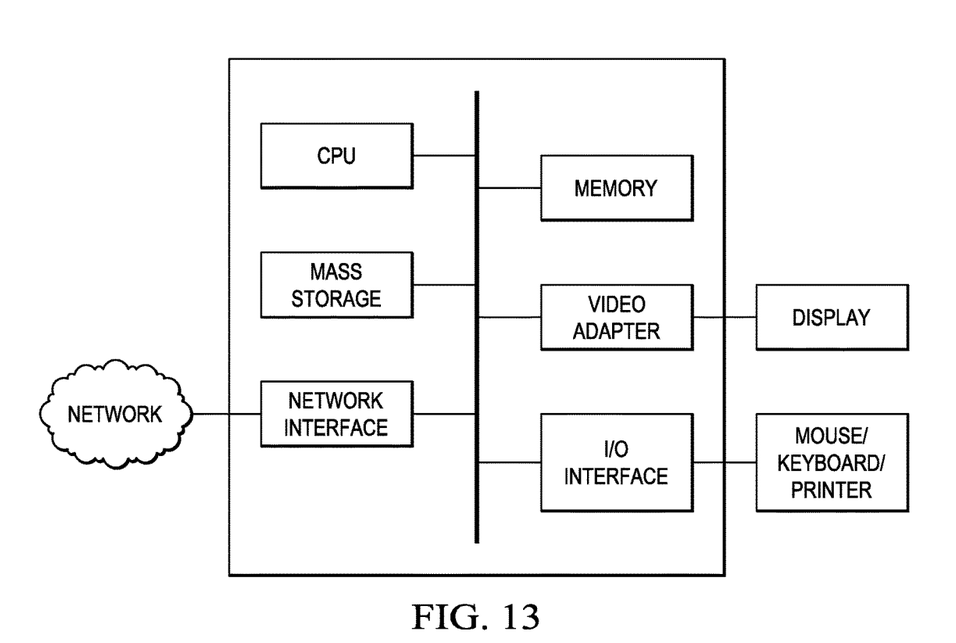
FIG. 13 illustrates a block diagram of an embodiment processing system.

FIG. 13 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for user subscription and provisioning in a wireless network, the method comprising: transmitting, by a wireless fidelity (Wi-Fi) access point (AP), a message comprising protocol capability information to one or more mobile stations, wherein the protocol capability information includes an on-line sign up (OSU) method list field consisting of a single octet of bits indicating that the Wi-Fi AP is using both an Open Mobile Alliance—Device Management (OMA-DM) protocol and a Simple Object Access Protocol—Extensible Markup Language (SOAP-XML) protocol when establishing network access for the one or more mobile stations; receiving, by the Wi-Fi AP, a request from a mobile station in response to the message, the request indicating a request for performing an OSU procedure with the Wi-Fi AP using the OMA-DM protocol or the SOAP-XML protocol; and performing, by the Wi-Fi AP, the OSU procedure with the mobile station using the OMA-DM protocol or the SOAP-XML protocol in response to receiving the request.

2. The method of claim 1, wherein the message is an Access Network Query Protocol (ANQP) message.

3. The method of claim 1, wherein the message is a beacon message.

4. The method of claim 1, wherein the message is a generic advertisement services (GAS) message.

5. The method of claim 1, wherein the message is a probe response message.

6. The method of claim 1, further comprising:
performing, by the Wi-Fi AP, a first OSU procedure for a first mobile station using the OMA-DM protocol; and
performing, by the Wi-Fi AP, a second OSU procedure for a second mobile station using the SOAP-XML protocol.

7. The method of claim 6, wherein the first mobile station comprises an OMA-DM capability while lacking a SOAP-XML capability, and wherein the second mobile station comprises a SOAP-XML capability while lacking an OMA-DM capability.

8. A wireless-fidelity (Wi-Fi) access point (AP) comprising: a processor; and a non-transitory computer readable storage medium storing programming for execution by the processor, the programming including instructions to: transmit a message comprising protocol capability information to one or more mobile stations, wherein the protocol capability information includes an on-line sign up (OSU) method list field consisting of a single octet of bits indicating that the Wi-Fi AP is using both an Open Mobile Alliance—Device Management (OMA-DM) protocol and a Simple Object Access Protocol—Extensible Markup Language (SOAP XML) protocol when establishing network access for the one or more mobile stations; receive a request from a mobile station in response to the message, the request indicating a request for performing an OSU procedure with the Wi-Fi AP using the OMA-DM protocol or the SOAP-XML protocol; and perform, by the Wi-Fi AP, the OSU procedure with the mobile station using the OMA-DM protocol or the SOAP-XML protocol in response to receiving the request.

9. The Wi-Fi AP of claim 8, wherein the message is an Access Network Query Protocol (ANQP) message.

10. The Wi-Fi AP of claim 8, wherein the message is a beacon message.

11. The Wi-Fi AP of claim 8, wherein the message is a generic advertisement services (GAS) message.

12. The Wi-Fi AP of claim 8, wherein the message is a probe response message.

13. A method for user subscription and provisioning in a wireless network, the method comprising: receiving, by a mobile station, a message from a wireless fidelity (Wi-Fi) access point (AP), wherein the message includes protocol capability information that includes an on-line sign up (OSU) method list field consisting of a single octet of bits indicating that the Wi-Fi AP is using both an Open Mobile Alliance—Device Management (OMA-DM) protocol and a Simple Object Access—Extensible Markup Language (SOAP-XML) protocol when establishing network access for the one or more mobile stations; transmitting, by the mobile station, a request to the Wi-Fi AP in response to the message, the request indicating a request for performing an OSU procedure with the Wi Fi AP using the OMA-DM protocol or the SOAP-XML protocol; and performing by the mobile station, the OSU procedure with the Wi-Fi AP using the OMA-DM protocol or the SOAP-XML protocol after transmitting the request.

14. The method of claim 13, wherein the message comprises an Access Network Query Protocol (ANQP) message.

15. The method of claim 13, wherein the message comprises a beacon message.

16. The method of claim 13, wherein the message comprises a generic advertisement services (GAS) message.

17. The method of claim 13, wherein the message is a probe response message.

18. A mobile station comprising: a processor; and a non-transitory computer readable storage medium storing programming for execution by the processor, the programming including instructions to: receive a message from a wireless fidelity (Wi-Fi) access point (AP), wherein the message includes protocol capability information that includes an on-line sign up (OSU) method list field consisting of a single octet of bits indicating that the Wi-Fi AP is using both an Open Mobile Alliance—Device Management (OMA-DM) protocol and a Simple Object Access Protocol—Extensible Markup Language (SOAP-XML) protocol when establishing network access for one or more mobile stations; transmit a request to the Wi-Fi AP in response to the message, the request indicating a request for performing an OSU procedure with the Wi-Fi AP using the OMA-DM protocol or the SOAP-XML protocol; and perform, by the mobile station, the OSU procedure with the Wi-Fi AP using the OMA-DM protocol or the SOAP-XML protocol after transmitting the request.

19. The Wi-Fi AP of claim 8, wherein the programming further includes instructions to:
perform a first OSU procedure for a first mobile station using the OMA-DM protocol; and
perform a second OSU procedure for a second mobile station using the SOAP-XML protocol.

20. The Wi-Fi AP of claim 19, wherein the first mobile station comprises an OMA-DM capability while lacking a SOAP-XML capability, and wherein the second mobile station comprises a SOAP-XML capability while lacking an OMA-DM capability.

21. The mobile station of claim 18, wherein the message comprises an Access Network Query Protocol (ANQP) message.

22. The mobile station of claim 18, wherein the message comprises a beacon message.

23. The mobile station of claim 18, wherein the message comprises a generic advertisement services (GAS) message.

24. The mobile station of claim 18, wherein the message is a probe response message.

* * * * *

UNITED STATES PATENT AND TRADEMARK OFFICE
CERTIFICATE OF CORRECTION

PATENT NO. : 9,907,014 B2
APPLICATION NO. : 13/933358
DATED : February 27, 2018
INVENTOR(S) : Bin Chen et al.

Page 1 of 1

It is certified that error appears in the above-identified patent and that said Letters Patent is hereby corrected as shown below:

In Column 10, Line 54, Claim 13, delete "for the one or more mobile stations" and insert --for one or more mobile stations--.

Signed and Sealed this
Eighth Day of May, 2018

Andrei Iancu
*Director of the United States Patent and Trademark Office*